(12) United States Patent
Xie et al.

(10) Patent No.: US 10,498,873 B2
(45) Date of Patent: Dec. 3, 2019

(54) SCREEN CONTROL METHOD, APPARATUS, AND NON-TRANSITORY TANGIBLE COMPUTER READABLE STORAGE MEDIUM (71) Applicant: Beijing Xiaomi Mobile Software Co., Ltd., Haidian District, Beijing (CN)

(72) Inventors: Fei Xie, Beijing (CN); Jie Fan, Beijing (CN); Chao Xi Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 3 days.

(21) Appl. No.: 15/798,099

(22) Filed: Oct. 30, 2017

(65) Prior Publication Data

US 2018/0124223 A1 May 3, 2018

Related U.S. Application Data

(63) Continuation of application No. PCT/CN2016/103951, filed on Oct. 31, 2016.

(51) Int. Cl.
*H04M 1/22* (2006.01)
*G06F 1/3231* (2019.01)
(Continued)

(52) U.S. Cl.
CPC ............ *H04M 1/22* (2013.01); *G06F 1/3231* (2013.01); *G06F 1/3265* (2013.01);
(Continued)

(58) Field of Classification Search
CPC ... H04M 1/22; H04M 2250/12; G06F 1/3231; G06F 1/3265; G06F 2200/1637; G09G 2320/0626; H04W 52/0254
(Continued)

(56) References Cited

U.S. PATENT DOCUMENTS

| | | | |
|---|---|---|---|
| 2013/0147712 A1* | 6/2013 | Zhou | G06F 1/1694 345/158 |
| 2014/0141833 A1* | 5/2014 | Fan | H04M 1/72597 455/550.1 |
| 2014/0213323 A1 | 7/2014 | Holenarsipur | |

FOREIGN PATENT DOCUMENTS

| CN | 103647875 A | 3/2014 |
|---|---|---|
| CN | 103780746 A | 5/2014 |

(Continued)

OTHER PUBLICATIONS

European Extended Search Report issued in corresponding EP Patent Application No. 17199163.1, dated Feb. 28, 2018, 10 pages.

(Continued)

*Primary Examiner* — Edward F Urban
*Assistant Examiner* — Angelica M Perez
(74) *Attorney, Agent, or Firm* — Arch & Lake LLP (57) ABSTRACT

The present disclosure provides a screen control method, apparatus and non-transitory tangible computer readable storage medium, in the field of mobile terminal technology. The method comprises: acquiring distance information and orientation information during conversation of a mobile terminal; adjusting brightness of a screen to a brightness lower than a preset brightness threshold when the mobile terminal is determined to conform to a preset condition in accordance with the distance information and the orientation information; erroneous operation is avoided.

19 Claims, 4 Drawing Sheets

(51) Int. Cl.
 *G06F 1/3234* (2019.01)
 *H04W 52/02* (2009.01)
(52) U.S. Cl.
 CPC . *H04W 52/0254* (2013.01); *G06F 2200/1637* (2013.01); *G09G 2320/0626* (2013.01); *H04M 2250/12* (2013.01); *Y02D 10/153* (2018.01); *Y02D 10/173* (2018.01)
(58) Field of Classification Search
 USPC ................ 455/566, 550.1, 574, 575.1–575.4
 See application file for complete search history.

(56) References Cited

FOREIGN PATENT DOCUMENTS

| CN | 104639732 A | 5/2015 |
|---|---|---|
| CN | 104717364 A | 6/2015 |
| CN | 105096912 A | 11/2015 |
| CN | 105245717 A | 1/2016 |
| CN | 105653033 A | 6/2016 |

OTHER PUBLICATIONS

International Search Report (including English translation) and Written Opinion issued in corresponding International Patent Application No. PCT/CN2016/103951, dated Jul. 10, 2017, 14 pages.

* cited by examiner

SCREEN CONTROL METHOD, APPARATUS, AND NON-TRANSITORY TANGIBLE COMPUTER READABLE STORAGE MEDIUM

CROSS-REFERENCE TO RELATED APPLICATION

This application claims priority to International Patent Application No. PCT/CN2016/103951, filed on Oct. 31, 2016 and titled "SCREEN CONTROL METHOD AND APPARATUS," the entire contents of which are incorporated herein by reference.

TECHNICAL FIELD

The present disclosure relates to mobile terminal technology, and more particularly to a screen control method, apparatus and non-transitory tangible computer readable storage medium.

BACKGROUND

Mobile terminals with conversation function such as mobile phones normally have the function to control the screen to be on or off in accordance with the distance between the screen of the mobile terminal and user's face during conversation.

In the related art, a distance sensor is installed in the mobile terminal to acquire the distance between the screen and the user' face during conversation. For example, the mobile terminal may turn on or turn off the screen according to the acquired distance.

SUMMARY

The embodiments of the present disclosure provide a screen control method, apparatus and non-transitory tangible computer readable storage medium, as follows:

In a first aspect of the present disclosure, a screen control method is provided. The method comprises: acquiring distance information between a screen of a mobile terminal and an adjacent object and orientation information of the mobile terminal during conversation of the mobile terminal, wherein the distance information indicates a distance between the screen and the adjacent object, and the orientation information indicates a orientation of the mobile terminal; determining whether the mobile terminal conforms to a preset condition in accordance with the distance information and the orientation information; and adjusting brightness of the screen to a brightness lower than a preset brightness threshold, when the mobile terminal conforms to the preset condition; the preset condition includes: within a preset period, the distance between the screen and the adjacent object is greater than a preset screen-on distance, and the orientation of the mobile terminal is not a preset orientation.

In a second aspect of the present disclosure, a screen control apparatus is provided. The apparatus comprises: a processor; and a storage storing executable instructions executed by the processor; wherein, the processor is configured to: acquire distance information between a screen of a mobile terminal and an adjacent object and orientation information of the mobile terminal during conversation of the mobile terminal; wherein the distance information indicates a distance between the screen and the adjacent object, the orientation information indicates a orientation of the mobile terminal; determine whether the mobile terminal conforms to a preset condition in accordance with the distance information and the orientation information; and adjust brightness of the screen to a brightness lower than a preset brightness threshold, when the mobile terminal conforms to the preset condition; the preset condition includes: within a preset period, the distance between the screen and the adjacent object is greater than a preset screen-on distance, and the orientation of the mobile terminal is different from a preset orientation.

In a third aspect of the present disclosure, there is provided a non-transitory tangible computer readable storage medium comprising: at least an instruction, a program, a code set or instruction set, stored in the non-transitory tangible computer readable storage medium, and loaded and executed on a processor for implementation of: acquiring distance information between a screen of a mobile terminal and an adjacent object and orientation information of the mobile terminal during conversation of the mobile terminal; wherein the distance information indicates a distance between the screen and the adjacent object, the orientation information indicates a orientation of the mobile terminal; determining whether the mobile terminal conforms to a preset condition in accordance with the distance information and the orientation information; adjusting brightness of the screen to a brightness lower than a preset brightness threshold, when the mobile terminal conforms to the preset condition; the preset condition includes: within a preset period, the distance between the screen and the adjacent object is greater than a preset screen-on distance, and the orientation of the mobile terminal is different from a preset orientation.

It is understandable that both the foregoing general description and the following detailed description are exemplary only, and are not intended to limit the present disclosure.

BRIEF DESCRIPTION OF THE DRAWINGS

The drawings herein are incorporated in and constitute a part of this specification, showing the embodiments of the present disclosure and, together with the specification, utilized to explain the principles of the present disclosure.

DETAILED DESCRIPTION OF THE EMBODIMENTS

Hereinafter, exemplary embodiments will be described in detail, the embodiments are shown in the drawings. In the following description when referring to the drawings, the same numerals in the different drawings denote the same or similar elements, unless otherwise indicated. The embodiments described in the following exemplary embodiments are not representative of all embodiments consistent with the present disclosure. Rather, they are merely examples of apparatuses and methods consistent with some aspects of the present disclosure as detailed in the claims.

In the related art, the distance between a screen and user's face is acquired via a distance sensor. Distance sensor includes various types such as infrared distance sensor, laser distance sensor, and ultrasonic distance sensor, etc. With similar working principles, the distance sensor includes a transmitter and a receiver. Transmitter sends out signals (such as infrared ray, laser or ultrasonic wave) which will be reflected by obstacles. And the receiver receives the reflected signals. In accordance with the energy value of the reflected signal received by the receiver, the distance sensor could therefore determine the distance between the distance sensor and the obstacle.

When a distance sensor acquires the distance between the screen and user's face, the acquired distance is more accurate when the plane of the screen is parallel to the plane of the user's face (that is, the plane of user's profile for answering the phone). As shown in part (a) of FIG. 1, when the plane of the screen is parallel to the plane of user's face, the transmission distance of the transmission signal from transmitter 11 of the distance sensor is equal to the transmission distance of the reflected signal received by receiver 12. In this case, the distance between the screen and user's face determined in accordance with the energy value of the reflected signal is more accurate.

Figure 1:
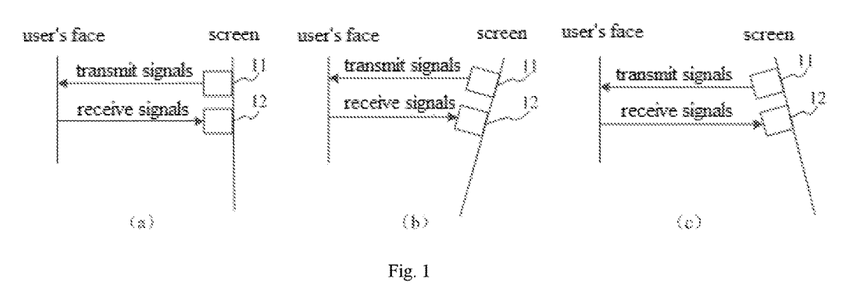
FIG. 1 is a schematic diagram of acquiring a distance between a screen and user's face via a distance sensor shown in accordance with an exemplary embodiment.

However, in practice, the plane of the screen and the plane of user's face during the conversation may not be parallel as shown in parts (b) and (c) of FIG. 1. In case of part (b) of FIG. 1, the acquired energy value of the reflected signal is bigger, resulting in the determined distance to be shorter. In case of part (c) of FIG. 1, the acquired energy value is smaller, resulting in the determined distance to be longer.

When the acquired distance between the screen and user's face is not accurate, in accordance with which the controlling the screen to be on or off would not be accurate either. In the related art, the mobile terminal is set up with the function of auto-lock screen that could be triggered when the screen is on and the mobile terminal does not receive a user operation for a duration longer than the preset screen lock period to turn off the power to control the mobile terminal to turn off the screen. The user could only switch the mobile terminal from screen lock state back to normal state (unlock state) by a preset unlock mode. For example, after the user triggers to turn on the screen and enters the correct password, the mobile terminal could switch from the screen lock state back to normal state. During the conversation, the mobile terminal would also trigger the auto-lock screen function. When the mobile terminal switches to screen lock state, the screen of the mobile terminal would no longer be turned on when the distance between the screen and user's face is greater than the preset screen-on distance. During the conversation, the related art would keep the screen on for a long time due to the longer distance between the screen and user's face detected by distance sensor, and trigger the auto-lock screen function of the mobile terminal, resulting in that the screen would not be turned on when the user moves the screen away from the face. The above operation process of the mobile terminal is inconvenient to the user and neither in line with the original design purpose nor user's expectation.

In some embodiments, screen states include screen-on state, screen-off state and screen lock state. Screen-on state means that the screen is turned on; screen-off state means that the power of the screen is not disconnected and the screen is not turned on; screen lock state means that the power of the screen is disconnected.

Based on above, the present disclosure provides a screen control method and an apparatus in accordance with the method to solve the problem of the mis-triggering auto-lock screen process due to inaccurate distance between the screen and user's face detected by a distance sensor in the related art. One of the technical solutions in the present disclosure is to acquire the distance information between the screen of the mobile terminal and the adjacent object, and the orientation information of the mobile terminal, and to comprehensively utilize the distance information and the orientation information to optimize the control logic of turning screen on and off during conversation. The present disclosure will be described in further details below with regards to the common aspects of the embodiments of the present disclosure mentioned above.

Each step in the method provided by the present disclosure may be implemented by a mobile terminal with conversation function. For example, the mobile terminal could be an electronic device such as a mobile phone, a tablet, a wearable device, etc.

Figure 2:
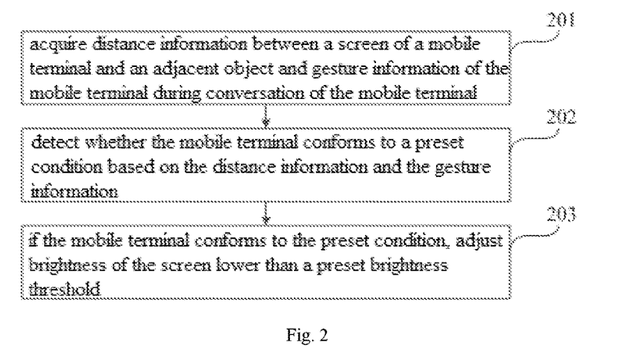
FIG. 2 is a flow diagram of a screen control method shown in accordance with an exemplary embodiment.

FIG. 2 is a flow diagram illustrating a screen control method in accordance to an exemplary embodiment, which may include following steps.

At step 201, during conversation of the mobile terminal, the distance information and the adjacent object and the orientation information of the mobile terminal is acquired.

The conversation process is the process of a mobile terminal from dialing out to hanging up a conversation; or the process from answering to hanging up a conversation.

In addition, conversation involved in the embodiments of the present disclosure includes but is not limited to: Circuti Switched (CS) network conversation and Packet Switch (PS) network voice conversation.

Distance information is configured to indicate the distance between the screen and the adjacent object, usually user's face. The mobile terminal can acquire the distance information between the screen and the adjacent object via a distance sensor. In the embodiments of the present disclosure, the type of the distance sensor is not limited, which could be an infrared distance sensor, a laser distance sensor, or an ultrasonic distance sensor, etc.

In some embodiments, the mobile terminal acquires the distance information via the distance sensor in the way of acquiring the energy value of the reflected signal, which is the distance information between the screen of the mobile terminal and the adjacent object. The reflected signal herein is the signal transmitted from the distance sensor and received by the distance sensor after reflected by the adjacent object. As the energy of the transmitted signal from transmitter of the distance sensor is constant, after the transmitter sends out the transmitted signal, the receiver will receive the reflected signal reflected by the adjacent object. The energy value of the reflected signal received by the receiver is negatively correlated with the distance between the screen and the adjacent object. Therefore, the energy value of the reflected signal can reflect the distance between the screen and the adjacent object.

The orientation information indicates the placement state of the mobile terminal, such as the vertical placement state, the horizontal placement state, the tilted placement state, the inverted placement state, etc. The mobile terminal could acquire the orientation information via a gravity sensor (G-sensor).

In some embodiments, the mobile terminal acquires the orientation information via the gravity sensor in the way of collecting the acceleration data, which is the orientation information of the mobile terminal. As the acceleration data collected by the built-in gravity sensor is different when the orientation of the mobile terminal is different, the acceleration data could reflect the orientation of the mobile terminal. Alternatively, the gravity sensor could be a triaxial gravity sensor to acquire the three-dimensional acceleration data of the mobile terminal. The acceleration data may include gravitational acceleration data and linear acceleration data.

For example, the triaxial gravity sensor collects the three-dimensional acceleration data. Provided that the data collected by the triaxial gravity sensor is (0, 0, 9.81) when the mobile terminal is positioned flatwise with front facing up on a horizontal table top, the orientation information of the mobile terminal is: the mobile terminal is positioned flatwise with front facing up; in this case, the data collected by the triaxial gravity sensor is (0, 0, −9.81) when the mobile terminal is positioned with front facing down on the table top and the orientation information of the mobile terminal is: the mobile terminal is positioned flatwise with front facing down; when the mobile terminal inclines towards left and value on x axis is positive, the orientation information of the mobile terminal is: the mobile terminal inclines towards left; when the mobile terminal inclines towards right and value on x axis is negative, the orientation information of the mobile terminal is: the mobile terminal inclines towards right; when the mobile terminal inclines upward and value on y axis is negative, the orientation information of the mobile terminal is: the mobile terminal inclines upward; when the mobile terminal inclines downward, and value on y axis is positive, the orientation information of the mobile terminal is: the mobile terminal inclines downward.

At step 202, the mobile terminal may determine whether the mobile terminal conforms to the preset condition in accordance with the distance information and the orientation information.

In some embodiments, the preset condition includes: within the preset period, the distance between the screen and the adjacent object is greater than the preset screen-on distance, and the orientation of the mobile terminal is different from the preset orientation. Wherein the preset screen-on distance refers to the preset distance which triggers the screen to switch from off to on. The preset orientation refers to the preset orientation of the mobile terminal during the conversation when the plane of the screen is considered to be parallel or nearly parallel to the plane of the adjacent object, which could be calculated from a large number of experimental data. The preset period refers to the preset period for triggering the adjustment of the brightness of the screen to a brightness lower than the preset brightness threshold. The preset period is less than the preset screen lock period described below.

In some embodiments, the nearly parallel state is a state when the value difference between the acceleration data in this state and the acceleration data in a parallel state is less than or equal to a preset value. Generally, the preset value is small, such as, 0.5, 0.4, etc., and the preset value may be set by developers. For instance, the difference between the acceleration in x axis direction which is in a nearly parallel state and the acceleration in x axis direction which is in a parallel state can be less than a first preset value, the difference between the acceleration in y axis direction which is in a nearly parallel state and the acceleration in y axis direction which is in a parallel state can be less than a second preset value, and the difference between the acceleration in z axis direction which is in a nearly parallel state and the acceleration in z axis direction which is in a parallel state can be less than a third preset value.

In some embodiments, when the distance information is the energy value of the reflected signal acquired by the distance sensor, and the orientation information is the acceleration data acquired by the gravity sensor, this step includes the following sub-steps:

1. To check whether the following condition is met within the preset period: the energy value of the reflected signal is less than the preset energy threshold, and the acceleration data does not belong to the preset acceleration value interval.

2. To determine the mobile terminal conforms to the preset condition when the above condition is met within the preset period. Otherwise, the mobile terminal is then determined not to conform to the preset condition when the above condition is not met within the preset period.

Corresponding to the preset screen-on distance, the preset energy threshold refers to the energy value of the reflected signal received by the distance sensor when the distance between the screen and the adjacent object is the preset screen-on distance. As described above, the energy value of the reflected signal received by the distance sensor is negatively correlated with the distance between the screen and the adjacent object. Therefore, when the energy value of the reflected signal is less than the preset energy threshold, it indicates that the distance between the screen and the adjacent object is greater than the preset screen-on distance.

Corresponding to the preset orientation, the preset acceleration value interval refers to the value interval consisting of the acceleration data related to the mobile terminal in preset orientation. In practice, the preset acceleration value interval could be constructed in accordance with the corresponding acceleration data collected from a large number of experiments simulating the mobile terminal track and orientation changes during the process of user from picking up the mobile terminal to moving it towards the face for conversation. In the process of above simulation, when the mobile terminal moves as close as possible towards the face, the plane of the screen is parallel or nearly parallel to the plane of the adjacent object (i.e., the plane of user's profile answering the phone). In this way, in accordance with the preset acceleration value interval acquired through above simulation, when the acceleration data acquired by the mobile terminal belongs to the preset acceleration value interval, it indicates that the plane of the screen is parallel or nearly parallel to the plane of the adjacent object. That is to say, the angle between the plane of the screen and the plane of the adjacent object would be relatively small, in which case the error of distance detected by the distance sensor would be minor. When the acceleration data acquired by the mobile terminal does not belong to the preset acceleration value interval, it indicates that the plane of the screen is not parallel nor nearly parallel to the plane of the adjacent object. That is to say, the angle between the plane of the screen and plane of the adjacent object is relatively big, in which case the error of distance detected by the distance sensor is relatively big. When the distance sensor acquires a small distance error, it could trigger the operation of turning the screen on or off in accordance with the distance; when the distance sensor acquires a big distance error, in order to avoid erroneous implementation of the auto-lock screen process, the mobile terminal would implement the following step 203 when the mobile terminal is determined to conform to the preset condition to avoid triggering the screen lock state.

At step 203, the brightness of the screen is adjusted to a brightness lower than the preset brightness threshold when the mobile terminal conforms to the preset condition.

In the embodiments of the present disclosure, in order to avoid mis-triggering the auto-lock screen process due to the inaccurate distance between the screen and the adjacent object detected by the distance sensor, when the mobile terminal is determined to conform to the preset condition, it would adjust the brightness of the screen to a brightness lower than the preset brightness threshold, instead of triggering the auto-lock screen process. Wherein, the preset brightness threshold could be set by the system of the mobile terminal by default, or by the user.

In some embodiments, the brightness value lower than the preset brightness threshold can be any brightness value between the minimum brightness value the screen can reach and the preset brightness threshold (including the minimum brightness value and the preset brightness threshold), which is the brightness value when the screen is turned off.

In some embodiments, after adjusting the brightness of the screen to a brightness lower than the preset brightness threshold, the mobile terminal would maintain the adjusted brightness until the end of the conversation. That is, before the end of the conversation, the mobile terminal no longer controls the screen to be on or off in accordance with the distance between the screen and the adjacent object.

In some other embodiments, after adjusting the brightness of the screen to the brightness lower than the preset brightness threshold, the mobile terminal would adjust the brightness of the screen from lower than the preset brightness threshold to the original brightness value when a user operation is received. Alternatively, it would adjust the brightness of the screen from lower than the preset brightness threshold to the brightness value determined in accordance with the environment brightness. The original brightness value refers to the display brightness before the mobile terminal adjusts the brightness of the screen to the brightness lower than the preset brightness threshold. The environment brightness could be collected by a light sensor. The mobile terminal could have the function of adjusting the display brightness in accordance with the environment brightness with adaptability. For example, the display brightness is positively correlated with the environment brightness. The above approach ensures that users could view the content displayed on the screen in normal.

In addition, after the conversation ends, the mobile terminal would adjust the brightness of the screen from lower than the preset brightness threshold to the original brightness value, or it would adjust the brightness of the screen from lower than the preset brightness threshold to the brightness value determined in accordance with the environment brightness.

Accordingly, the method provided in the present embodiments acquires the distance information between the screen of the mobile terminal and the adjacent object and the orientation information of the mobile terminal during conversation of the mobile terminal, and determines whether the mobile terminal conforms to preset condition in accordance with the distance information and the orientation information. When the mobile terminal conforms to the preset condition, it adjusts the brightness of the screen to a brightness lower than the preset brightness threshold. Since the distance information is determined to be accurate or not in accordance with the orientation information, when the distance information is not accurate, it adjusts the brightness of the screen to a brightness lower than the preset brightness threshold instead of triggering the auto-lock screen process to avoid erroneous operation.

Figure 3:
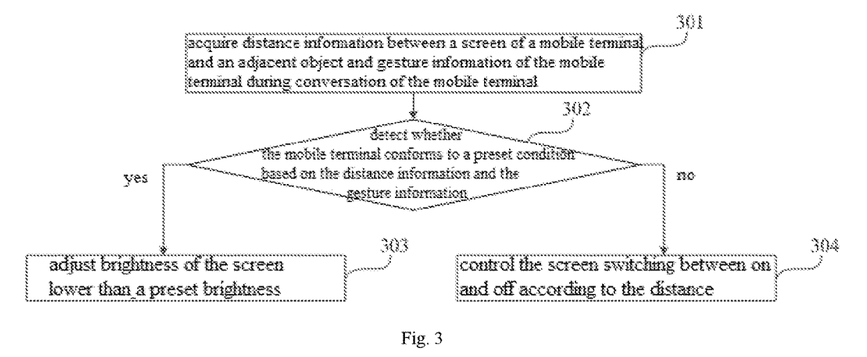
FIG. 3 is a flow diagram of a screen control method shown in accordance with another exemplary embodiment.

FIG. 3 is a flow diagram of a screen control method shown in accordance with another exemplary embodiment. The method comprises following steps.

At step 301, to acquire distance information between a screen of a mobile terminal and an adjacent object and orientation information of the mobile terminal is during conversation of the mobile terminal.

Introduction and description of step 201 can be used as references for step 301 and will not be described again hereto.

At step 302, the mobile terminal determines whether the mobile terminal conforms to the preset condition in accordance with the distance information and the orientation information. When the mobile terminal conforms to the preset condition, following step 303 would be implemented. When the mobile terminal does not conform to the preset condition, following step 304 or step 305 would be implemented.

Introduction and description of step 202 can be used as references for step 302 and will not be described again hereto.

At step 303, the brightness of the screen is adjusted to a brightness lower than the preset brightness threshold.

Introduction and description of step 203 can be used as references for step 303 and will not be described again hereto.

At step 304, the screen is controlled to switch between on and off in accordance with the distance information.

Screen-on state means that the screen is turned on, i.e. the power of the screen is connected; screen-off state means that the screen is turned off, i.e. the power of the screen is disconnected.

When the screen is on and the distance between the screen and the adjacent object changes from greater than a preset screen-off distance to less than the preset screen-off distance, controlling the screen to switch from on to off; when the screen is off and the distance between the screen and the adjacent object changes from less than the preset screen-on distance to greater than the preset screen-on distance, controlling the screen to switch from off to on. Wherein, the preset screen-off distance is equal to the preset screen-on distance, or the preset screen-off distance is less than the preset screen-on distance.

Presumably, the screen of the mobile terminal is turned on when conversation starts. During the process of the user moving the mobile terminal towards the face, the distance between the screen and the face gradually becomes shorter. Until the distance is less than the preset screen-off distance, the mobile terminal controls the screen to switch from on to off. If the user needs to use the screen, he/she then would gradually move the mobile terminal away from the face, during which the distance between the screen and the face gradually become longer. Until the distance is greater than the preset screen-on distance, the mobile terminal controls the screen to switch from off to on.

In addition, as the distance between the screen and the adjacent object could be indicated by the energy value of the reflected signal received by the distance sensor, the above preset screen-off distance and the preset screen-on distance could also be indicated by the corresponding preset energy threshold.

In addition, when the screen is on and the mobile terminal does not receive a user operation for a duration longer than the preset screen lock period, the mobile terminal would switch itself to the screen lock state. When the mobile terminal does not conform to the preset condition, and when the screen is on and the mobile terminal does not receive a user operation for a duration longer than the preset screen lock period, the auto-lock screen process would be triggered. The preset screen lock period is longer than the preset period described above. For example, the preset screen lock period is 90 seconds and the preset period is 60 seconds. In addition, the user operation may be any operation on the mobile terminal performed by the user, such as clicking the screen, clicking or adjusting physical buttons, etc.

The method mentioned above can be used to confirm whether or not the distance information is accurate in accordance with the orientation information. When the distance information is confirmed to be relatively accurate, the original screen control logic during the conversation would be implemented, that is, the screen would be controlled to switch between on and off in accordance with the distance information; when the distance information is confirmed not to be accurate, the brightness of the screen would be adjusted to a brightness lower than the preset brightness threshold, instead of triggering the auto-lock screen process to avoid erroneous operation.

In some embodiments, in accordance with FIG. 2 or FIG. 3, the method includes following steps: during a conversation, the mobile terminal determines whether it's in a hands-free conversation state. When the mobile terminal is in the hands-free conversation state, the brightness of the screen would be controlled to maintain at the original brightness value, or, the brightness of the screen would be adjusted to the brightness value determined in accordance with the environment brightness; when the mobile terminal is not in the hands-free conversation state, the steps of acquiring the distance information between the screen of the mobile terminal and the adjacent object and the orientation information of the mobile terminal would be implemented. When the mobile terminal conforms to preset condition, the brightness of the screen would be adjusted to a brightness lower than the preset brightness threshold. When the mobile terminal does not conform to the preset condition, the screen would be controlled to switch between on and off in accordance with the distance information.

In some embodiments, the approach of determining whether the mobile terminal itself is in the hands-free conversation state includes, but is not limited to the followings:

In a first approach, the mobile terminal determines whether the operating state of the handset is off, and whether the operating state of the speaker is on; the mobile terminal determines itself to be in the hands-free conversation state, when the operating state of the handset is off and the operating state of the speaker is on; the mobile terminal determines itself not to be in the hands-free conversation state, when the operating state of the handset is on or the operating state of the speaker is off.

In some embodiments, the operating state of the handset and/or the speaker can be set in accordance with received setting operations input by users. For example, when a user clicks the hands-free button, the operating state of the speaker is set to be on and the operating state of the handset is set to be off.

In a second approach, the mobile terminal determines whether the operating state of the handset is off; the mobile terminal determines itself to be in the hands-free conversation state, when the operating state of the handset is off; the mobile terminal determines itself not to be in the hands-free conversation state, when the operating state of the handset is on.

Since usually either the handset or the speaker in the mobile terminal is in an on state, that is to say, the speaker is in an off state when the handset is in an on state; the speaker is in an on state when the handset is in an off state. Therefore, the mobile terminal can determine itself whether or not to be in the hands-free conversation state only in accordance with the operating state of the handset.

In a third approach, the mobile terminal determines whether the operating state of the speaker is on; the mobile terminals determines itself to be in the hands-free conversation state, when the operating state of the handset is off; the mobile terminals determines itself not to be in the hands-free conversation state, when the operating state of the speaker is off.

The above approaches ensure that users could view the content displayed on the screen in normal in a hands-free conversation state.

Figure 4:
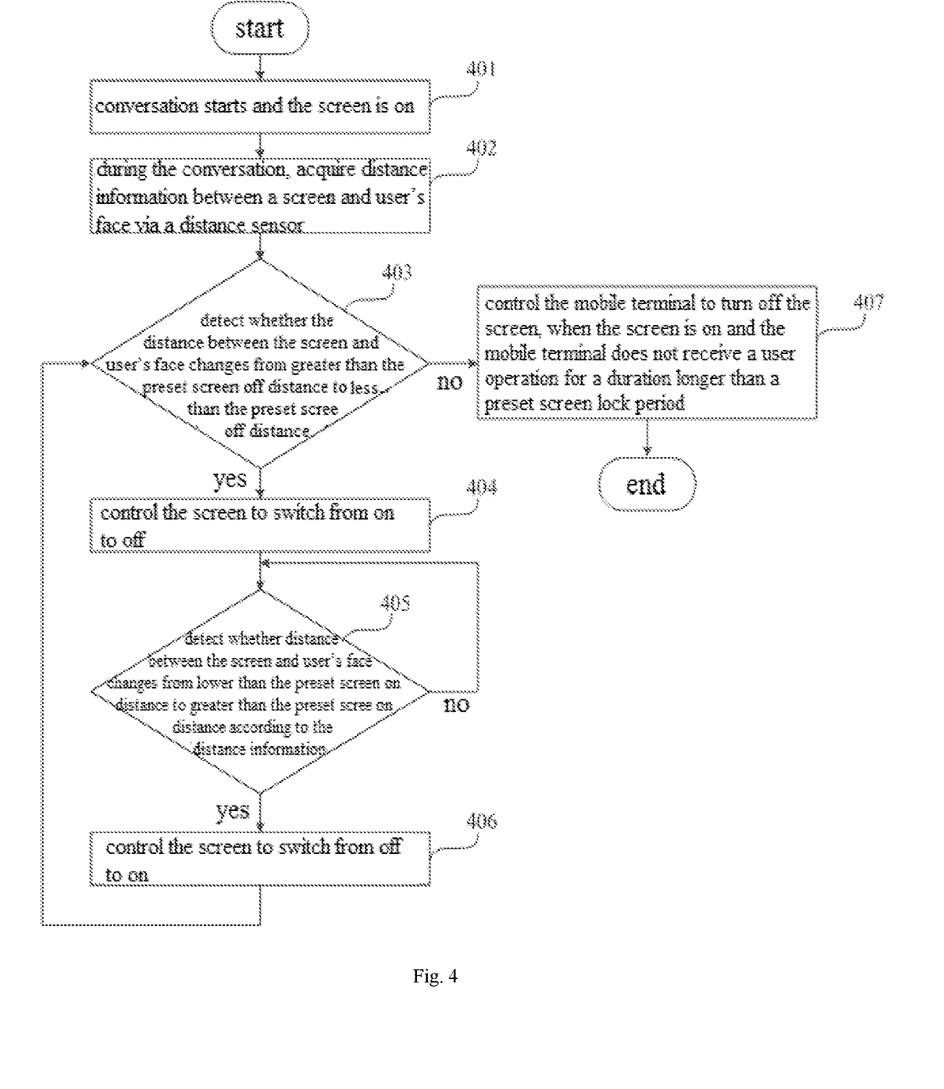
FIG. 4 is a flow diagram of a screen control method of the related art.
Figure 5:
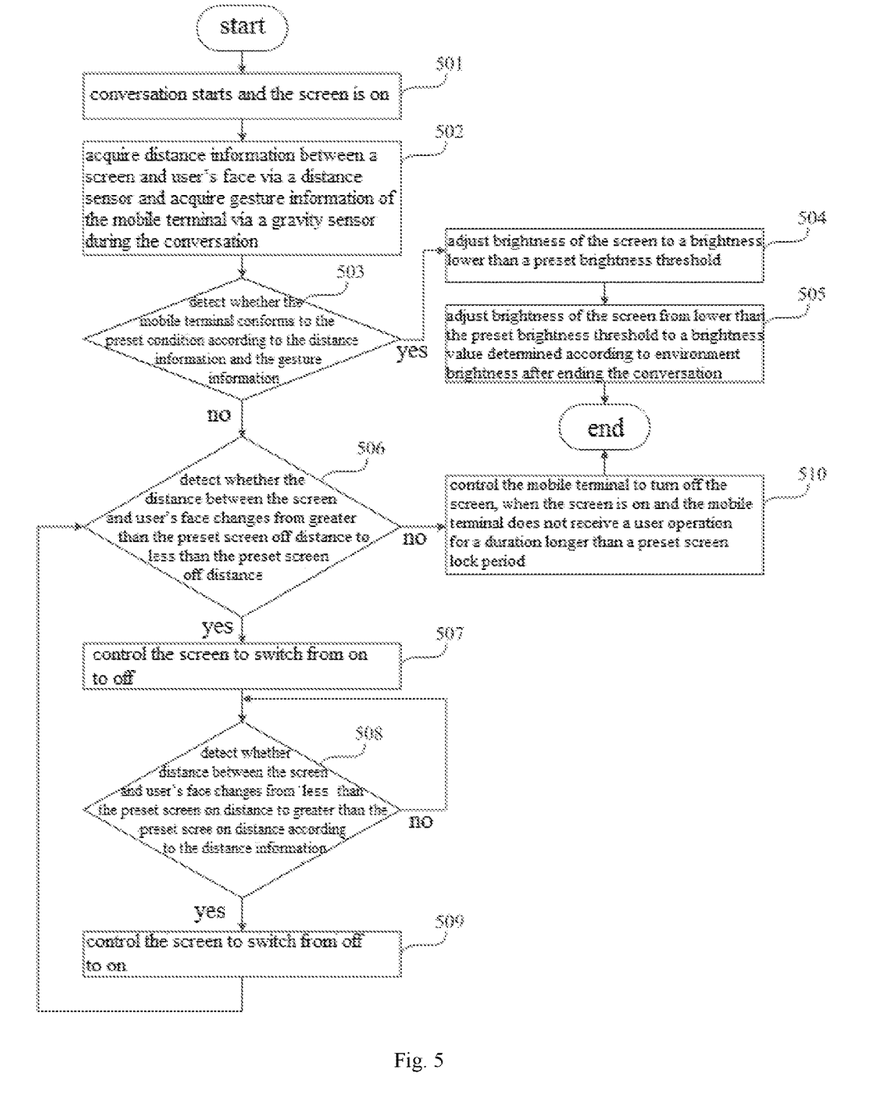
FIG. 5 is a flow diagram of a screen control method of the present disclosure.

To describe the differences between the technical solutions provided by the present disclosure and the related art more clearly, the followings introduce the screen control process of the related art and the screen control process of the present disclosure through FIG. 4 and FIG. 5 respectively.

FIG. 4 is a flow diagram of a screen control method of the related art. The method may include following steps.

At step 401, conversation starts and the screen is on;

At step 402, during the conversation, distance information between a distance sensor and user's face is detected by the distance sensor;

At step 403, whether the distance between the screen and user's face changes from greater than a preset screen-off distance to less than the preset screen-off distance is determined in accordance with the distance information. If yes, following step 404 would be implemented; if not, following step 407 would be implemented;

At step 404, the screen is controlled to switch from on to off following step 405 can be implemented after step 404;

At step 405, the mobile terminal compares the distance between the screen and user's face with a preset screen-on distance. The mobile terminal then determines whether the distances changes from less than a preset screen-on distance to greater than the preset screen-on distance in accordance with the distance information. If the distance is greater than the preset screen-on distance, step 406 would be implemented. If not, step 405 would be implemented again.

At step 406, the screen is controlled to switch from off to on; after step 406, 405 described above would be implemented;

At step 407, the mobile terminal is controlled to turn off the screen when the screen is on and the mobile terminal does not receive a user operation for a duration longer than the preset screen lock period.

FIG. 5 is a flow diagram of a screen control method provided by the present disclosure which includes following steps:

At step 501, conversation starts and the screen is on;

At step 502, during the conversation, distance information between the screen and user's face is obtained by a distance sensor, and orientation information of the mobile terminal is obtained by a gravity sensor;

At step 503, whether the mobile terminal conforms to a preset condition is determined in accordance with the distance information and the orientation information; if yes, the following steps 504 and 505 would be implemented; if not, the following step 506 would be implemented;

At step 504, brightness of the screen is adjusted to a brightness lower than the preset brightness threshold;

At step 505, after the end of the conversation, the brightness of the screen is adjusted from lower than the preset brightness threshold to a brightness value determined in accordance with the environment brightness;

At step 506, the distance between the screen and user's face is detected whether or not to change from greater than the preset screen-off distance to less than the preset screen-off distance in accordance with the distance information; if yes, the following step 507 would be implemented; if not, the following step 510 would be implemented;

At step 507, the screen is controlled to switch from on to off; after step 507, the following step 508 would be implemented;

At step 508, the distance between the screen and user's face is detected whether or not to change from less than the preset screen-on distance to greater than the preset screen-on distance in accordance with the distance information; if yes, the following step 509 would be implemented; if not, step 508 would be implemented again;

At step 509, the screen is controlled to switch from off to on; after step 509, step 503 described above would be implemented;

At step 510, the mobile terminal is controlled to turn off the screen, when the screen is on and the mobile terminal does not receive a user operation for a duration longer than the preset screen lock period.

In accordance with the flowcharts shown in FIG. 4 and FIG. 5 above, the preset screen-off distance is equal to the preset screen-on distance; alternatively, the preset screen-off distance is less than the preset screen-on distance.

In accordance with the flowcharts shown in FIG. 4 and FIG. 5, in the embodiments of the present disclosure, the orientation information of the mobile terminal is acquired during the conversation, in accordance with which the distance information is determined to be accurate or not. If the distance information is determined not to be accurate, the brightness of the screen would be adjusted to a brightness lower than the preset brightness threshold instead of triggering the auto-lock screen process to avoid erroneous operation.

Some exemplary embodiments of the present disclosure provide a screen control apparatus capable of implementing the screen control method provided by the present disclosure. The apparatus comprises: a processor; and a storage storing executable instructions executed by the processor. Wherein, the processor is configured to: acquire distance information between a screen of a mobile terminal and an adjacent object and orientation information of the mobile terminal during conversation of the mobile terminal, where the distance information is configured to indicate a distance between the screen and the adjacent object, the orientation information is configured to indicate a orientation of the mobile terminal; determine whether the mobile terminal conforms to a preset condition in accordance with the distance information and the orientation information; and adjust brightness of the screen to a brightness lower than a preset brightness threshold when the mobile terminal conforms to the preset condition; the preset condition includes: within the preset period, the distance between the screen and the adjacent object is greater than a preset screen-on distance, and the orientation of the mobile terminal is not a preset orientation.

In some embodiments, the preset screen-on distance refers to a preset distance for triggering the screen to switch from off to on; the preset orientation refers to a preset orientation of the mobile terminal when the plane of the screen is parallel or nearly parallel to the plane of the adjacent object during conversation of the mobile terminal; the preset period refers to a preset period for triggering the adjustment of the brightness of the screen to a brightness lower than the preset brightness threshold.

In some embodiments, the processor is configured to: acquire energy value of a reflected signal via a distance sensor, the energy value of reflected signal is the distance information, wherein the reflected signal is a signal that is transmitted from the distance sensor and received by the distance sensor after reflected by the adjacent object; and collect acceleration data via a gravity sensor, and the acceleration data is the orientation information.

In some embodiments, the processor is configured to: within the preset period, determine whether the energy value of reflected signal is less than a preset energy threshold, the acceleration data does not belong to a preset acceleration value interval; determine the mobile terminal conforms to the preset condition, when the energy value of reflected signal is less than a preset energy threshold and the acceleration data does not belong to a preset acceleration value interval within the preset period.

In some embodiments, the processor is configured to: control the screen to switch from on to off, when the mobile terminal does not conform to the preset condition, and when the screen is on and the distance between the screen and the adjacent object changes from greater than a preset screen-off distance to less than the preset screen-off distance; control the screen to switch from off to on, when the screen is off and the distance between the screen and the adjacent object changes from less than the preset screen-on distance to greater than the preset screen-on distance; and wherein, the preset screen-off distance is equal to the preset screen-on distance, or the preset screen-off distance is less than the preset screen-on distance.

In some embodiments, the processor is configured to: control the mobile terminal to turn off the screen, when the mobile terminal does not conform the preset condition, and when the screen is on and the mobile terminal does not receive a user operation for a duration longer than a preset screen lock period.

In some embodiments, the processor is configured to: adjust brightness of the screen from lower than a preset brightness threshold to an original brightness value after ending a conversation; or adjust brightness of the screen from lower than a preset brightness threshold to a brightness value determined in accordance with environment brightness after ending the conversation.

In some embodiments, the processor is configured to: determine whether the mobile terminal is in a hands-free conversation state; and acquire distance information between the screen of the mobile terminal and the adjacent object and orientation information of the mobile terminal, when the mobile terminal is not in the hands-free conversation state.

Figure 6:
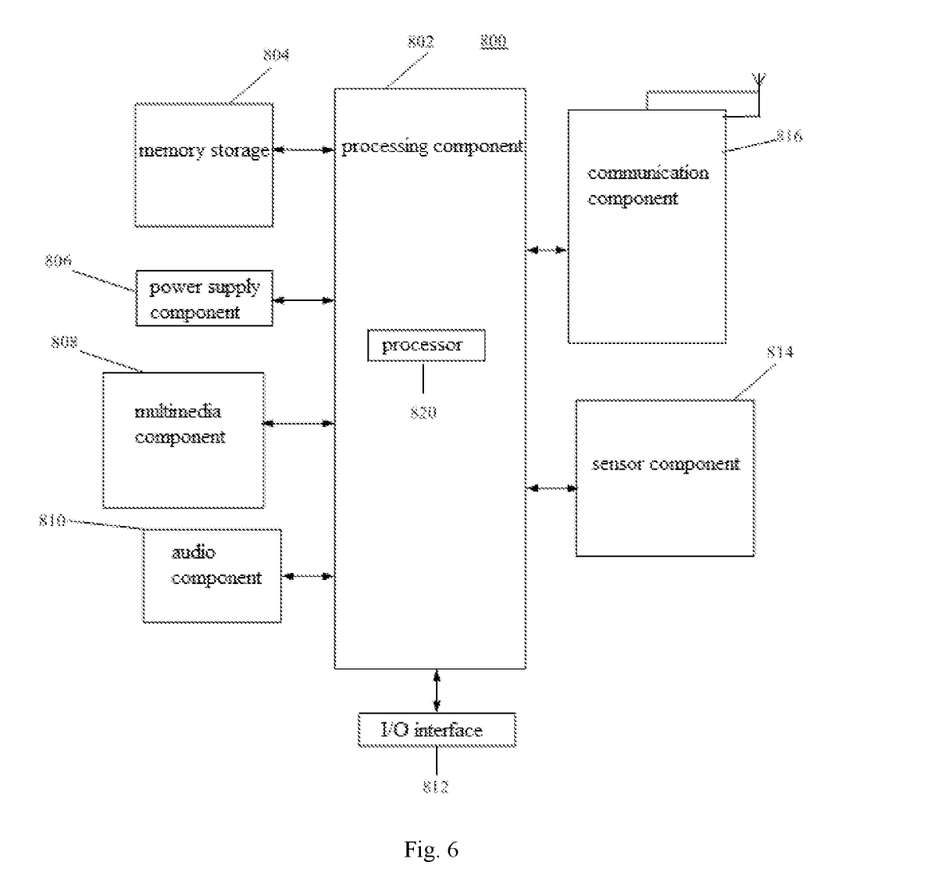
FIG. 6 is a block diagram of an apparatus shown in accordance with an exemplary embodiment.

FIG. 6 is a block diagram of an apparatus 800 in accordance with an exemplary embodiment. For example, the apparatus 800 may be a mobile phone, a computer, a digital broadcast terminal, a messaging device, a game console, a tablet device, a medical device, a fitness device, a personal digital assistant, and the like.

As shown in FIG. 6, the apparatus 800 may include one or more of the following components: a processing component 802, a memory storage 804, a power supply component 806, a multimedia component 808, an audio component 810, an input/output (I/O) interface 812, a sensor component 814, and a communication component 816.

The processing component 802 generally can control the overall operation of the apparatus 800, such as operations associated with display, phone conversation, data communication, camera operation, and recording operations. The processing component 802 may include one or more processors 820 to execute instructions, to complete all or part of the steps described above. In addition, the processing component 802 may include one or more modules to facilitate the interactions between the processing component 802 and other components. For example, the processing component 802 may include a multimedia module to facilitate interaction between the multimedia component 808 and the processing component 802.

The memory storage 804 can be configured to store various types of data to support the operation of the apparatus 800. Examples of such data can include instructions of any application or method, contact data, phonebook data, messages, pictures, videos, and the like, that operates on the apparatus 800. The memory storage 804 may be implemented by any type of volatile or nonvolatile memory device or a combination thereof, such as static random access memory (SRAM), electriconversationy erasable programmable read only memory (EEPROM), erasable programmable read only memory (EPROM), programmable read only memory (PROM), read only memory (ROM), magnetic memory, flash memory, disk or CD.

The power supply component 806 can provide power to the various components of the apparatus 800. The power supply component 806 may include a power management system, one or more power supplies, and other components associated with generating, managing, and distributing power for the apparatus 800.

The multimedia component 808 may include a screen providing an output interface between the apparatus 800 and the user. In some embodiments, the screen may include a liquid crystal display (LCD) and a touch panel (TP). If the screen includes a touch panel, the screen may be implemented as a touch screen to receive input signals from the user. The touch panel can include one or more touch sensors to sense touches, slide, and orientations on touch panels. The touch sensors may sense not only the boundary of the touch or slide actions, but also the duration and pressure associated with the touch or slide operation. In some embodiments, the multimedia component 808 may include a front camera and/or a rear camera. When the apparatus 800 is at an operating mode, such as a shooting mode or a video mode, the front camera and/or the rear camera can receive external multimedia data. Each front camera and rear camera can be a fixed optical lens system or have focal length and optical zoom capability.

The audio component 810 can be configured to output and/or input an audio signal. For example, the audio component 810 can include a microphone (MIC) that is configured to receive external audio signals when the apparatus 800 is in the operating mode, such as a conversation mode, a recording mode, and a voice recognition mode. The received audio signals may be further stored in the memory storage 804 or transmitted via the communication component 816. In some embodiments, the audio component 810 can also include a speaker for outputting the audio signals.

The I/O interface 812 can provide the interface between the processing component 802 and a peripheral interface module, the peripheral interface module may be a keyboard, a mouse, buttons, or the like. The buttons may include, but are not limited to, a home button, a volume button, a start button, and a lock button.

The sensor component 814 may include one or more sensors for providing condition assessments of the various aspects of the apparatus 800. For example, the sensor component 814 may detect the on/off state of the apparatus 800, the relative positioning of the components, for example the components can be the display and keypad of the apparatus 800, and the sensor component 814 may also detect position changes of the apparatus 800 or any component thereof, presence or absence of the user contact with the apparatus 800, orientation, acceleration/deceleration, or the temperature changes of the apparatus 800. The sensor component 814 may include an approaching sensor configured to detect the presence of a nearby object without any physical contact. The sensor component 814 may also include a light sensor, such as a CMOS or CCD image sensor, for imaging applications. In some embodiments, the sensor component 814 may also include acceleration sensors, gyro sensors, magnetic sensors, pressure sensors, or temperature sensors.

The communication component 816 can be configured to facilitate wired or wireless communication between the apparatus 800 and other apparatuses. The apparatus 800 may access a wireless network based on a communication standard, such as WiFi, 2G or 3G, or a combination thereof. In an exemplary embodiment, the communication component 816 can receive broadcast signals or broadcast-related information from an external broadcast management system via broadcast channels. In an exemplary embodiment, the communication component 816 can also include a near field communication (NFC) module to facilitate short-range communication. For example, the NFC module may be implemented based on radio frequency identification (RFID) technology, infrared data association (IrDA) technology, ultra wideband (UWB) technology, Bluetooth (BT) technology and other techniques.

In an exemplary embodiment, the apparatus 800 may be implemented by one or more application specific integrated circuits (ASICs), digital signal processors (DSPs), digital signal processing devices (DSPDs), programmable logic devices (PLDs), field programmable gate array (FPGA), a controller, a microcontroller, a microprocessor, or other electronic components for performing the method described above.

In an exemplary embodiment, there is also provided a non-transitory computer readable storage medium comprising at least an instruction, a program, a code set or instruction set, stored in the non-transitory tangible computer readable storage medium, and loaded and executed on a processor for implementation of the screen control method described above. For example, the non-transitory computer readable storage medium can be the memory storage 804 including the instructions. The instructions may be executed on the processor 820 of the apparatus 800 to complete the method described above. For example, the non-transitory computer readable storage medium may be a ROM, a random access memory (RAM), a CD-ROM, a magnetic tape, a floppy disk, an optical data storage device, etc.

Understandably, the term "plurality" herein refers to two or more. "And/or" herein describes the correspondence of the corresponding objects, indicating three kinds of relationship. For example, A and/or B, can be expressed as: A exists alone, A and B exist concurrently, B exists alone. The character "/" generally indicates that the context object is an "OR" relationship. The word "detect" may be understood as "determine" in some of the drawings.

In some embodiments, acquiring distance information between the screen of the mobile terminal and the adjacent object and orientation information of the mobile terminal includes: acquiring energy value of a reflected signal via a distance sensor, and the energy value of the reflected signal is the distance information; wherein the reflected signal is a signal that is transmitted from the distance sensor and received by the distance sensor after reflected by the adjacent object; collecting acceleration data via a gravity sensor, and the acceleration data is the orientation information In some embodiments, determining whether the mobile terminal conforms to the preset condition in accordance with the distance information and the orientation information includes: within the preset period, determining whether the energy value of the reflected signal is less than a preset energy threshold, and the acceleration data does not belong to a preset acceleration value interval; and determining the mobile terminal conforms to the preset condition, when the energy value of reflected signal is less than a preset energy threshold and the acceleration data does not belong to a preset acceleration value interval within the preset period.

In some embodiments, the method further comprises: controlling the screen to switch from on to off, when the mobile terminal does not conform to the preset condition, and when the screen is on and the distance between the screen and the adjacent object changes from greater than a preset screen-off distance to less than the preset screen-off distance; controlling the screen to switch from off to on, when the screen is off and the distance between the screen and the adjacent object changes from less than the preset screen-on distance to greater than the preset screen-on distance; and wherein the preset screen-off distance is equal to the preset screen-on distance, or the preset screen-off distance is less than the preset screen-on distance.

In some embodiments, the method further comprises: controlling the mobile terminal to turn off the screen, when the mobile terminal does not conform to the preset condition, and when the screen is on and the mobile terminal does not receive a user operation for a duration longer than a preset screen lock period.

In some embodiments, the method further comprises: adjusting the brightness of the screen from lower than a preset brightness threshold to an original brightness value after ending a conversation; or adjusting brightness of the screen from lower than a preset brightness threshold to a brightness value determined in accordance with environment brightness after ending the conversation.

In some embodiments, the method further comprises: acquiring distance information between the screen of the mobile terminal and the adjacent object and orientation information of the mobile terminal when the mobile terminal is not in a hands-free conversation state.

In some embodiments, the preset screen-on distance refers to a preset distance for triggering the screen to switch from off to on; the preset orientation refers to a preset orientation of the mobile terminal when the plane of the screen is parallel or nearly parallel to the plane of the adjacent object during conversation of the mobile terminal; the preset period refers to a preset period for triggering the adjustment of the brightness of the screen to a brightess lower than the preset brightness threshold.

In some embodiments, the processor is configured to: acquire energy value of a reflected signal via a distance sensor, the energy value of the reflected signal is the distance information; wherein the reflected signal is a signal that is transmitted from the distance sensor and received by the distance sensor after reflected by the adjacent object; and collect acceleration data via a gravity sensor, and the acceleration data is the orientation information.

In some embodiments, the processor is configured to, within the preset period, determine whether the energy value of the reflected signal is less than a preset energy threshold, and the acceleration data does not belong to a preset acceleration value interval; and determine the mobile terminal conforms to the preset condition, when the energy value of the reflected signal is less than the preset energy threshold and the acceleration data does not belong to the preset acceleration value interval within the preset period.

In some embodiments, the processor is configured to: control the screen to switch from on to off, when the mobile terminal does not conform to the preset condition, and when the screen is on and the distance between the screen and the adjacent object changes from greater than a preset screen-off distance to less than the preset screen-off distance; control the screen to switch from off to on, when the screen is off and the distance between the screen and the adjacent object changes from less than a preset screen-on distance to greater than the preset screen-on distance; and wherein, the preset screen-off distance is equal to the preset screen-on distance, or the preset screen-off distance is less than the preset screen-on distance.

In some embodiments, the processor is configured to control the mobile terminal to turn off the screen, when the mobile terminal does not conform the preset condition, and when the screen is on and the mobile terminal does not receive a user operation for a duration longer than a preset screen lock period.

In some embodiments, the processor is configured to: adjust brightness of the screen from lower than a preset brightness threshold to an original brightness value after ending a conversation; or adjust brightness of the screen from lower than a preset brightness threshold to a brightness value determined in accordance with environment brightness after ending the conversation.

In some embodiments, the processor is configured to: acquire distance information between the screen of the mobile terminal and the adjacent object and orientation information of the mobile terminal when the mobile terminal is not in a hands-free conversation state.

In some embodiments, the preset screen-on distance refers to a preset distance for triggering the screen to switch from off to on; the preset orientation refers to a preset orientation of the mobile terminal when the plane of the screen is parallel or nearly parallel to the plane of the adjacent object during conversation of the mobile terminal; the preset period refers to a preset period for triggering the adjustment of the brightness of the screen to a brightess lower than the preset brightness threshold.

The technical solution provided by the present disclosure may include the following advantageous benefits. Acquiring the distance information between the screen of the mobile terminal and the adjacent object and the orientation information of the mobile terminal during conversation of the mobile terminal, determining whether the mobile terminal conforms to preset condition in accordance with the distance information and the orientation information, adjusting the brightness of the screen to a brightness lower than the preset brightness threshold when the mobile terminal conforms to the preset condition. The distance information is determined to be accurate or not based on the orientation information. When the distance information is not accurate, it adjusts the brightness of the screen to a brightness lower than the preset brightness threshold instead of triggering the auto-lock screen process to avoid erroneous operation and improve the accuracy of screen control.

Other embodiments of the present disclosure can be available to those skilled in the art upon consideration of the specification and practice of the present disclosure herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

Understandably, this disclosure is not limited to the precise constructions described above and shown in the enclosed drawings, and various modifications and changes may be made without departing from the scope thereof. The scope of the present disclosure can be limited only by the appended claims.

What is claimed is:

1. A method for controlling a mobile terminal, comprising:
    acquiring, by the mobile terminal, distance information and orientation information of the mobile terminal when the mobile terminal is in a conversation state, wherein the distance information indicates a distance between the screen and an adjacent object, the orientation information indicates an orientation of the mobile terminal;
    determining whether the mobile terminal conforms to a preset condition in accordance with the distance information and the orientation information; and
    adjusting brightness of the screen to a brightness lower than a preset brightness threshold when the mobile terminal conforms to the preset condition;
    wherein the preset condition comprises: within a preset period, the distance between the screen and the adjacent object is greater than a preset screen-on distance, and the orientation of the mobile terminal is not a preset orientation;
    wherein determining whether the mobile terminal conforms to the preset condition in accordance with the distance information and the orientation information includes:
    within the preset period, determining whether an energy value of a reflected signal is less than a preset energy threshold, and an acceleration data is outside of a preset acceleration value interval; and
    determining the mobile terminal conforms to the preset condition when the energy value of the reflected signal is less than the preset energy threshold and the acceleration data is outside of the preset acceleration value interval within the preset period;
    wherein the preset acceleration value interval within the preset period is obtained by user experiments simulating the mobile terminal track and orientation changes during phone conversations.

2. The method of claim 1, wherein acquiring the distance information and the adjacent object and orientation information of the mobile terminal comprises:
    acquiring the energy value of the reflected signal via a distance sensor, the energy value of the reflected signal is the distance information, wherein the reflected signal is a signal that is transmitted from the distance sensor and received by the distance sensor after reflected by the adjacent object; and
    collecting the acceleration data via a gravity sensor, and the acceleration data is the orientation information.

3. The method of claim 1 further comprising:
    controlling the screen to switch from on to off, when the mobile terminal does not conform to the preset condition, and when the screen is on and the distance between the screen and the adjacent object changes from greater than a preset screen-off distance to less than the preset screen-off distance; and
    controlling the screen to switch from off to on, when the screen is off and the distance between the screen and the adjacent object changes from less than the preset screen-on distance to greater than the preset screen-on distance.

4. The method of claim 3, wherein the preset screen-off distance is less than or equal to the preset screen-on distance.

5. The method of claim 1 further comprising:
    controlling the mobile terminal to turn off the screen, when the mobile terminal does not conform to the preset condition, and when the screen is on and the mobile terminal does not receive a user operation for a duration longer than a preset screen lock period.

6. The method of claim 1 further comprising:
    adjusting the brightness of the screen from lower than a preset brightness threshold to an original brightness value after ending a conversation.

7. The method of claim 1 further comprising:
    adjusting the brightness of the screen from lower than a preset brightness threshold to a brightness value determined in accordance with environment brightness after ending the conversation.

8. The method of claim 1 further comprising:
    acquiring the distance information between the screen of the mobile terminal and the adjacent object and the orientation information of the mobile terminal, when the mobile terminal is not in a hands-free conversation state.

9. The method of claim 1, wherein the preset screen-on distance refers to a preset distance for triggering the screen to switch from off to on; the preset orientation refers to a preset orientation of the mobile terminal when the plane of the screen is parallel or nearly parallel to the plane of the adjacent object during conversation of the mobile terminal; the preset period refers to a preset period for triggering the adjustment of the brightness of the screen to a brightness lower than the preset brightness threshold.

10. The method of claim 1, wherein the adjusting brightness of the screen to a brightness lower than a preset brightness threshold when the mobile terminal conforms to the preset condition further comprises:
    maintaining the adjusted brightness until end of the conversation state, wherein the mobile terminal no longer controls the screen to be on or off in accordance with the distance between the screen and the adjacent object.

11. An apparatus for controlling a screen, comprising:
    a processor; and
    a storage storing executable instructions executed by the processor;
    wherein, the processor is configured to:
    acquire distance information between a screen of a mobile terminal and an adjacent object and orientation information of the mobile terminal during conversation of the mobile terminal, wherein the distance information indicates a distance between the screen and the adjacent object, the orientation information indicates a orientation of the mobile terminal;
    determine whether the mobile terminal conforms to a preset condition in accordance with the distance information and the orientation information; and
    adjust brightness of the screen to a brightness lower than a preset brightness threshold, when the mobile terminal conforms to the preset condition;
    wherein the preset condition comprises: within a preset period, the distance between the screen and the adjacent object is greater than a preset screen-on distance, and the orientation of the mobile terminal is different from a preset orientation;

wherein determining whether the mobile terminal conforms to the preset condition in accordance with the distance information and the orientation information includes:

within the preset period, determining whether an energy value of a reflected signal is less than a preset energy threshold, and an acceleration data is outside of a preset acceleration value interval; and determining the mobile terminal conforms to the preset condition when the energy value of the reflected signal is less than the preset energy threshold and the acceleration data is outside of the preset acceleration value interval within the preset period;

wherein the preset acceleration value interval within the preset period is obtained by user experiments simulating the mobile terminal track and orientation changes during phone conversations.

12. The apparatus of claim 11, wherein the processor is configured to:

acquire the energy value of the reflected signal via a distance sensor, the energy value of the reflected signal is the distance information, wherein the reflected signal is a signal that is transmitted from the distance sensor and received by the distance sensor after reflected by the adjacent object; and collect the acceleration data via a gravity sensor, and the acceleration data is the orientation information.

13. The apparatus of claim 11, wherein the processor is configured to:

control the screen to switch from on to off, when the mobile terminal does not conform to the preset condition, and when the screen is on and the distance between the screen and the adjacent object changes from greater than a preset screen-off distance to less than the preset screen-off distance;

control the screen to switch from off to on, when the screen is off and the distance between the screen and the adjacent object changes from less than the preset screen-on distance to greater than the preset screen-on distance.

14. The apparatus of claim 13, wherein the preset screen-off distance is less than or equal to the preset screen-on distance.

15. The apparatus of claim 11, wherein the processor is configured to:

control the mobile terminal to turn off the screen, when the mobile terminal does not conform to the preset condition, and when the screen is on and the mobile terminal does not receive a user operation for a duration longer than a preset screen lock period.

16. The apparatus of claim 11, wherein the processor is configured to:

adjust the brightness of the screen from lower than the preset brightness threshold to an original brightness value after ending a conversation; or adjust the brightness of the screen from lower than the preset brightness threshold to a brightness value determined in accordance with environment brightness after ending the conversation.

17. The apparatus of claim 11, wherein the processor is configured to:

acquire distance information between the screen of the mobile terminal and the adjacent object and orientation information of the mobile terminal when the mobile terminal is not in a hands-free conversation state.

18. The apparatus of claim 11, wherein the preset screen-on distance refers to a preset distance for triggering the screen to switch from off to on; the preset orientation refers to a preset orientation of the mobile terminal when the plane of the screen is parallel or nearly parallel to the plane of the adjacent object during conversation of the mobile terminal; the preset period refers to a preset period for triggering the adjustment of the brightness of the screen to a brightness lower than the preset brightness threshold.

19. A non-transitory tangible computer readable storage medium comprising: at least an instruction, a program, a code set or instruction set, stored in the non-transitory tangible computer readable storage medium, and loaded and executed on a processor for implementation of: acquiring distance information between a screen of a mobile terminal and an adjacent object and orientation information of the mobile terminal during conversation of the mobile terminal; wherein, the distance information indicates a distance between the screen and the adjacent object, the orientation information indicates a orientation of the mobile terminal; determining whether the mobile terminal conforms to a preset condition in accordance with the distance information and the orientation information; adjusting brightness of the screen to a brightness lower than a preset brightness threshold when the mobile terminal conforms to the preset condition, the preset condition includes: within a preset period, the distance between the screen and the adjacent object is greater than a preset screen-on distance, and the orientation of the mobile terminal is different from a preset orientation;

wherein determining whether the mobile terminal conforms to the preset condition in accordance with the distance information and the orientation information includes:

within the preset period, determining whether an energy value of a reflected signal is less than a preset energy threshold, and an acceleration data is outside of a preset acceleration value interval; and wherein the preset acceleration value interval within the preset period is obtained by user experiments simulating the mobile terminal track and orientation changes during phone conversations.

* * * * *